Jan. 12, 1965   I. M. MACDONALD   3,165,686
MOTOR CONTROL APPARATUS

Filed July 24, 1961   2 Sheets-Sheet 1

WITNESSES:
Bernard R. Gieguey
Leon M. Garman

INVENTOR
Ian M. MacDonald
BY   Brodahl
ATTORNEY

United States Patent Office 3,165,686
Patented Jan. 12, 1965

3,165,686
MOTOR CONTROL APPARATUS
Ian M. Macdonald, Kenmore, N.Y., assignor to Westinghouse Electric Corporation, East Pittsburgh, Pa., a corporation of Pennsylvania
Filed July 24, 1961, Ser. No. 126,243
2 Claims. (Cl. 318—163)

The present invention relates in general to motor operation control apparatus, and more particularly to motor speed control apparatus for providing a periodic desired variation or cycling of the operational speed of a motor.

Prior art fractional and low integral horsepower rating motor operation control apparatus includes rotating generator equipment controlled by magnetic amplifiers or the like. This prior art control apparatus included moving parts requiring expensive maintenance or replacement and occupied considerable floor space. The prior art control system stability for applications of the smaller horsepower rating motors was sometimes problematical in particularly the textile and fiber spinning industries.

Accordingly, it is an object of the present invention to provide improved motor operation control apparatus requiring less maintenance, less floor space and being capable of providing improved motor operation control characteristics.

It is another object of the present invention to provide improved motor operation control apparatus having improved motor operation contrl characteristics, and more specifically to provide control apparatus better operative to vary the operational speed of a synchronous motor or an induction motor or the like relative to a reference speed in a desired periodic or cyclical manner and having an improved overall system stability.

The present invention in general relates to apparatus for controlling the operation, such as speed, of either one of a synchronous or induction motor, and which apparatus includes a variable frequency reference signal source for energizing a static inverter driving the motor, with the signal frequency being periodically varied or cycled continuously about that reference frequency by an oscillatory control signal source providing an oscillatory control signal having a controlled frequency variation period and a controlled amplitude of frequency variation for determining both the period and the amount of the reference signal variation.

Figure 1:
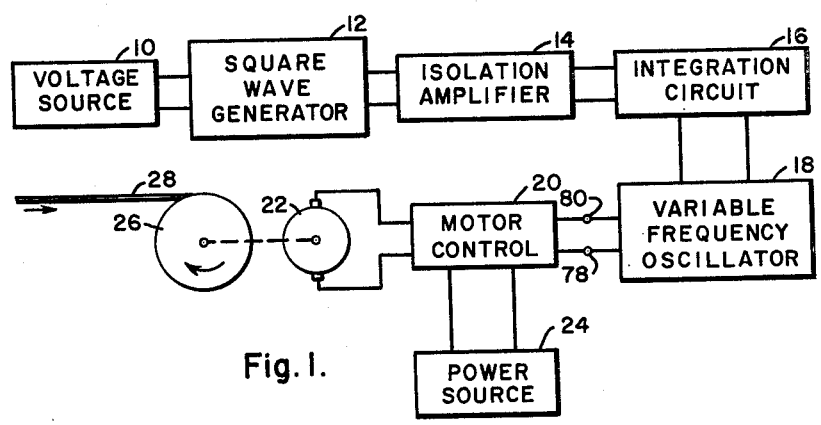
Figure 2A:
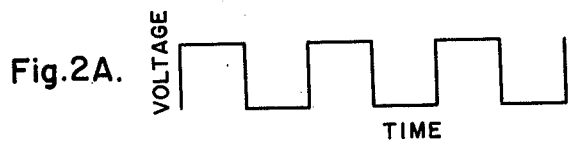
Figure 3:
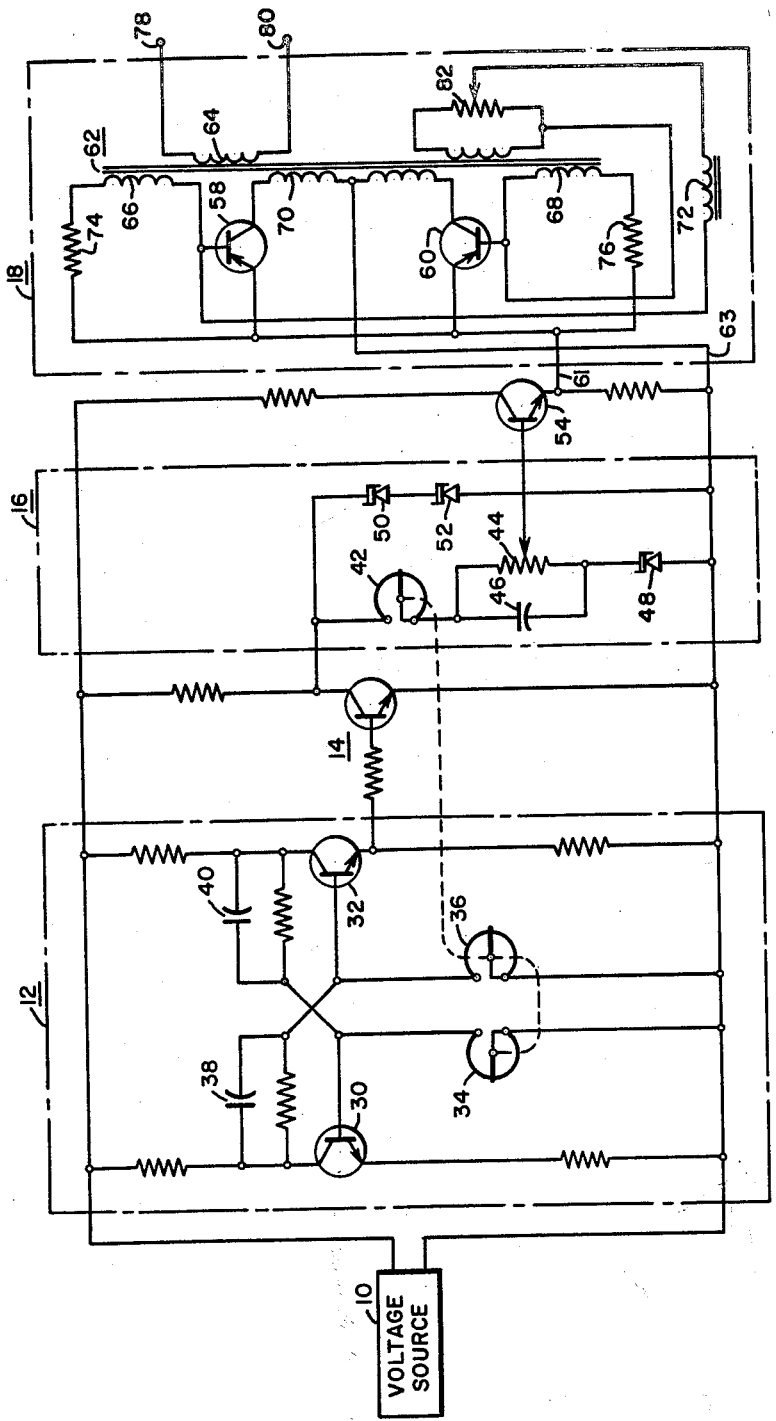

In FIG. 1 there is shown a diagrammatic showing of the present control apparatus;

In FIGS. 2A, B and C there is provided a curve chart illustrating the operation of the present control apparatus; and In FIG. 3 there is provided a schematic showing of the present control apparatus.

In FIG. 1 a voltage source 10 is operative with a square wave generator 12, which may include a relaxation type oscillator including a pair of transistors operative in a switching mode and whose output frequency is determined by cooperative potentiometers as will be described relative to the showing of FIG. 3. The square wave output signal from the square wave generator 12 passes through an isolation amplifier 14 to an integration circuit 16 and is applied to a variable frequency oscillator 18 for the purpose of controlling the output frequency of the signal provided by the variable frequency oscillator 18. The oscillatory output signal from the variable frequency oscillator 18 is operative with a motor control 20 for the purpose of controlling the operation of a motor 22. A suitable power source 24 is operative with the motor control 20 in this regard. The motor 22 can be coupled to a load such as a wind-up reel 26 operative with a fibrous strip of material 28, which may comprise a strip of textile material or a strip of glass fiber material.

Figure 2B:
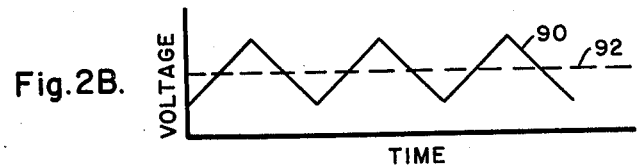
Figure 2C:
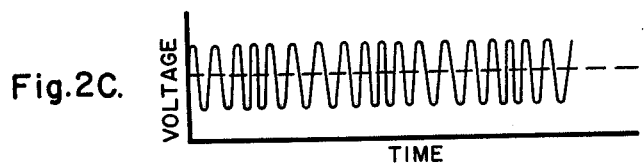

Referring to the curve chart of FIG. 2, there is shown in FIG. 2A the square wave output signal provided by the square wave generator 12. In FIG. 2B there is shown the output signal from the integration circuit 16 resulting from the integration of the square wave signal supplied by the square wave generator 12. In FIG. 2C there is shown the variable frequency output signal received from the variable frequency oscillator 18, and including an oscillatory signal having a frequency period which varies in accordance with the periodic variation of the integrated output signal received from the integration circuit 16 and in addition whose frequency varies by an amount in accordance with the amplitude of the output signal received from the integration circuit 16.

More specifically, if the reference frequency is 60 cycles per second and operative as the synchronous frequency of the motor 22, then the period or rate of frequency variation may be such that the output signal frequency is 62 c.p.s. for one second of time, then 60 c.p.s. for the next second of time, then 58 c.p.s. for the next second of time, then again 60 c.p.s. for the following second of time. The amplitude of frequency variation may be controlled such that the output signal varies between 65 c.p.s. for a one second time interval, then 60 c.p.s. for the next one second time interval, then 55 c.p.s. for the following time interval, and so forth. It should be noted as illustrated by the curve 2C that the output signal frequency varies about a reference frequency established by a suitable direct current bias voltage supplied to the variable frequency oscillator 18.

In FIG. 3 there is schematically shown the motor control apparatus in accordance with the teachings of the present invention. The voltage source 10 is operative with the relaxation type oscillator 12 including a transistor 30 and a transistor 32 operative in a switching mode as a multivibrator or flip-flop circuit and whose output frequency is determined by the ganged settings of potentiometers 34 and 36, respectively. The relaxation oscillator 12 is operative to produce a non-sinusoidal square wave output signal with the fundamental frequency of which being determined by the time required to charge or discharge the respective capacitors 38 and 40 through the respective potentiometers 36 and 34. The square wave output signal from the relaxation oscillator 12 is supplied through a buffer amplifier 14 to the integration circuit 16.

In general an integration circuit is operative such that it will change the wave shape of an applied input wave in a manner which is proportional to the way in which the voltage at any instant is added to the already existing voltage of the circuit. One method of accomplishing this function is to charge a large capacitance capacitor in series through a high resistance resistor. The output is then taken across the capacitor.

In this regard it should be noted that the RC network including the potentiometer 42 and the large capacitance capacitor 46 is operative to provide the output signal waveform as shown in FIG. 2B. The function of the Zener diodes 48, 50 and 52 is to provide the desired voltage regulation, with the Zener diodes 50 and 52 being operative as a signal clipping circuit to provide a desired fixed direct current bias voltage for controlling the operation of the variable frequency oscillator 18. The output signal from the integration circuit 16 as shown in FIG. 2B is supplied through a buffer amplifier 54 to the input of the variable frequency oscillator 18. The variable frequency oscillator 18 is operative as a transistorized inverter power supply and is described in issued U.S. Patent 2,937,298 assigned to the same assignee as is the present patent application.

In the variable frequency oscillator 18 a transistor inverter is provided including transistors 58 and 60 operative as switches for deriving from a direct current input signal an alternating current output signal. The transistor switches 58 and 60 are operative to switch the source of direct current voltage including conductors 61 and 63 across the primary winding 70 of a transformer 62 such that an alternating current voltage output signal appears across the secondary winding 64 of the transformer. In order to supply biasing voltages to the switching transistors 58 and 60 for maintaining the desired switch condition, the transformer 62 is provided with bias windings 66 and 68 which are connected to the transistors 58 and 60 to apply thereto voltages induced in the bias windings in response to the energization of the primary winding 70. The bias windings 66 and 68 are connected in a series circuit, including the switching reactor 72 and a pair of control resistors 74 and 76 which serve to bias the transistors 58 and 60 in response to saturation of the switching reactor 72. The output signal as shown in FIG. 2C is supplied through output terminals 78 and 80 which may be connected to the motor control 20 as shown in FIG. 1.

In the operation of the control apparatus as shown in FIGS. 1 and 3 a variable frequency reference signal is provided by the variable frequency oscillator 18 to the motor control 20 wherein any desired output frequency can be cycled continuously about the selected reference frequency with a period of variation and an amplitude variation separately controllable by the operation of the square wave generator 12 and the integration circuit 16. Thusly, the present control apparatus provides a reference frequency signal to a static inverter device operative for driving a synchronous type motor 22 which may be connected to a windup reel 26 as part of a man-made fiber machine. The operative speed of the motor 22 is thereby caused to vary in a periodic fashion about a predetermined synchronous speed as required to take up the man-made fiber evenly on the windup reel 26.

The frequency cycling control apparatus including the square wave generator 12 and the integration circuit 16 includes a relaxation type oscillator 12, with the transistors 30 and 32 being operative in a switching mode to provide an output frequency as shown by the curve in FIG. 2A, the frequency of which is determined by the commonly ganged adjustments of the potentiometers 34 and 36. The square wave output signal from the square wave generator 12 is integrated in the RC network including the potentiometer 42, the potentiometer 44 and the capacitor 46 of the integration circuit 16 to provide the output signal as shown by the curve of FIG. 2B. This integrated output signal is applied as a variable direct curent signal as shown in FIG. 2B to the input of the variable frequency oscillator 18, which comprises a multivibrator type oscillator having a saturable core 72 in the feedback circuit. As long as the potentiometer 44 is at the bottom of its travel the oscillator 18 will produce a frequency determined by the setting of the potentiometer 82, with the direct current input voltage supplied through conductors 61 and 63 when the potentiometer 44 is at the bottom of its travel being established by the Zener diode 48.

The amplitude of the integrated output signal 90 as shown in FIG. 2B is varied by adjusting the setting of the potentiometer 44. The frequency or periodic cycling of the output signal as shown in FIG. 2B is controlled by varying the time constant of the integration network by suitable adjustment of the potentiometer 42. This adjusment of the potentiometer 42, since it is commonly coupled or ganged to the potentiometer 34 and 36 within the square wave generator 12, is operative to concurrently adjust the frequency of the square wave output signal provided by the square wave generator 12 and varies the time constant of the RC network including the potentiometer 42, the potentiometer 44 and the capacitor 46.

The desired variation in the operational speed of the motor 22 about synchronous speed required for the present control apparatus is in general rather small, in the order of ±5%. The Zener diodes 48, 50 and 52 provide a clipping action to ensure a fixed direct current bias voltage 92 applied to the input of the variable frequency oscillator 18.

If the motor 22 is a synchronous motor it is an alternating current motor whose speed is in proportion to the frequency of the supply current. Thusly, the frequency variation in the output signal provided by the variable frequency oscillator 18 is operative to vary the speed of the motor 22 in accordance with the frequency variation of the curve shown in FIG. 2C. Thusly, the operational speed of the motor 22 is caused to vary in a periodic fashion about synchronous speed as desired to take up the man-made fiber 28 evenly on the windup reel 26, so that the fiber will subsequently come off the reel evenly.

Thus, it will be seen that by suitable adjustment of the ganged potentiometers 34, 36 and 42, the rate of change or period of the frequency variation of the output signal shown in curve 2C is controlled. The amplitude or amount of frequency change about reference or synchronous motor speed is controlled by suitable adjustment of the potentiometer 44.

It should also be noted that the motor control 20 can be operative as a well-known and conventional power amplifier. If desired, it could be single phase or three phase, and comprise the well-known static inverter device. A three phase motor may be operative to provide better speed control and more power than a single phase motor 22.

Although the present invention has been described with reference to certain specific embodiments thereof, numerous modifications can be readily made and it is desired to cover all modifications falling within the scope and spirit of the present invention.

I claim as my invention:

1. In apparatus operative with a motor to vary periodically the speed of said motor, the combination of first signal providing means for supplying a substantially square wave first control signal, second signal providing means for supplying a second control signal, signal frequency control means operative with said first signal providing means to provide a selected frequency variation period for said first control signal, signal frequency variation amplitude control means commonly operative with said signal frequency control means and being operative with said first signal providing means to integrate the first control signal and thereby provide a selected frequency variation amplitude for said first control signal, with said second signal providing means being operative with said motor and responsive to said integrated first control signal for energizing said motor with said second control signal to vary the speed of said motor by an amount in accordance with the amplitude of said frequency variation of the first control signal and in a periodic manner in accordance with the frequency variation period of said first control signal.

2. In apparatus for controlling the speed of a synchronous motor, the combination of an oscillatory signal providing means for providing a control signal having a selected frequency variation cycle, signal integration means operative with said signal providing means for integrating said control signal to have a selected amplitude of said variation cycle, and motor speed control apparatus operative with said motor for energizing said motor with a reference frequency signal to operate said motor at a reference synchronous speed, with said motor speed control apparatus being responsive to said control signal for varying said reference frequency signal and thereby the speed of said motor in accordance with both said selected amplitude of frequency variation cycle and said selected frequency variation cycle of the control signal.

References Cited in the file of this patent
UNITED STATES PATENTS

| | | |
|---|---|---|
| 2,763,824 | Bacheler | Sept. 18, 1956 |
| 2,938,129 | House | May 24, 1960 |